(12) United States Patent
Hare et al.

(10) Patent No.: US 7,814,863 B2
(45) Date of Patent: Oct. 19, 2010

(54) METHODS AND SYSTEMS FOR SUPPLYING LIQUID FEED TO LIVESTOCK

(76) Inventors: John Hare, 6-62 Scurfield Boulevard, Winnipeg, Manitoba (CA) R3Y 1M5; Gerard Grant Coyston, Box 286, Elie, Manitoba (CA) R0H 0H0

( * ) Notice: Subject to any disclaimer, the term of this patent is extended or adjusted under 35 U.S.C. 154(b) by 199 days.

(21) Appl. No.: 11/923,086

(22) Filed: Oct. 24, 2007

(65) Prior Publication Data

US 2009/0107405 A1    Apr. 30, 2009

(51) Int. Cl.
*A01K 7/00* (2006.01)
(52) U.S. Cl. .............................. 119/73; 119/72; 119/72.5
(58) Field of Classification Search .................. 119/72, 119/72.5, 73, 74, 75, 76, 77, 78, 79, 80, 81
See application file for complete search history.

(56) References Cited

U.S. PATENT DOCUMENTS

| | | | | |
|---|---|---|---|---|
| 4,370,948 A | * | 2/1983 | Atkins | 119/72.5 |
| 4,757,784 A | * | 7/1988 | Hammer | 119/75 |
| 5,025,754 A | * | 6/1991 | Plyler | 119/73 |
| 5,067,443 A | * | 11/1991 | Hurnik et al. | 119/71 |
| 5,074,248 A | * | 12/1991 | Loader | 119/505 |
| 5,115,764 A | * | 5/1992 | Soppe | 119/75 |
| 5,138,980 A | * | 8/1992 | Ewing | 119/73 |
| 5,319,937 A | * | 6/1994 | Fritsch et al. | 62/3.62 |
| 5,503,064 A | * | 4/1996 | Scheel et al. | 99/453 |
| 6,199,512 B1 | * | 3/2001 | Jefferson et al. | 119/74 |
| 6,387,419 B1 | * | 5/2002 | Christensen | 426/2 |
| 6,910,444 B1 | * | 6/2005 | Soppe | 119/73 |
| 2003/0150394 A1 | * | 8/2003 | Wolfe | 119/246 |
| 2004/0084096 A1 | * | 5/2004 | Whaley | 137/624.13 |

* cited by examiner

*Primary Examiner*—Timothy D Collins
*Assistant Examiner*—Justin Benedik
(74) *Attorney, Agent, or Firm*—Michael R. Williams (57) ABSTRACT

Methods and systems for providing liquid feed to livestock deliver the liquid feed to a feeding station at a temperature below that of the mother's natural milk to encourage use of the liquid feed by the young as a supplement and not a replacement. A second reservoir expands the capacity of the system without increasing the size of the mixing reservoir. The second reservoir is equipped with selectively operable refrigeration and heating elements to facilitate cooling of the liquid feed or heating of a cleaning solution. A peroxide doser introduces small quantifies of peroxide to clean the liquid feed and prevent gorging. Orifices through which feed is discharged at feeding stations decrease in cross sectional area along the circulation line in the direction of flow to counteract variation in discharge flow rates caused by a pressure differential in the liquid feed along the line.

16 Claims, 3 Drawing Sheets

FIG.1

METHODS AND SYSTEMS FOR SUPPLYING LIQUID FEED TO LIVESTOCK

This invention relates generally to methods and systems for feeding livestock and more particularly to methods and systems for supplying liquid feed to livestock.

BACKGROUND OF THE INVENTION

Many livestock producers employ automatic feeding systems for their livestock, sometimes a liquid feed in cases where there are younger animals such as piglets. In such cases, the liquid feed is often a form of milk replacer product, usually a mixture of dry powder and water. The feed may be either a dry milk replacer product or a condensed liquid feed product.

The milk delivery systems presently in use often comprise feeding units connected by pipelines to a reservoir tank, the pipelines providing a generally continuous circulating flow of liquid feed through the system, and the feeding units often include an animal-actuated valve mechanism to begin flow of the liquid feed into the feeding unit for consumption by the animal. In this way, liquid feed is supplied on an as-needed basis to the livestock and it does not become stagnant in the system while waiting for consumption.

U.S. Pat. No. 5,067,443 teaches a neonatal piglet nursing apparatus having a refrigerated storage tank to keep liquid feed fresh, but also having heating tanks to subsequently warm the liquid feed to body temperature before nursing to encourage consumption by the piglets. The apparatus is intended to provide a surrogate function, taking the place of a natural mother, and therefore attempts to simulate the natural feeding experience by, among other things, trying to match the temperature of a mother's natural milk.

PCT International Application Publication No. 97/15185 teaches an automatic feeder where again the liquid feed is stored in a refrigerated container but subsequently heated prior to delivery to young pig.

U.S. Pat. No. 5,138,980 teaches a temperature-regulated liquid animal feeder that, in colder environments, uses a heated feed reservoir to prevent freezing or, in warmer environments, uses a refrigerated reservoir to keep water cool or solid food fresh, to increase appeal to the animal.

U.S. Pat. No. 6,199,512 teaches a feed delivery system that includes a disinfecting station adapted to effect cleaning of a feeding station. The water used to formulate a powdered milk solution is heated by a hot water heater prior to entering a mix tank.

In the aforementioned prior art feeding systems, heating of the liquid feed may reduce the tendency of a piglet to favour a mother sow's natural milk in a situation where both the natural milk and the liquid feed are available. As the sow's colostrum or first milk has contents that are valuable to the healthy development of the piglets and are not found in conventional liquid feed, a high level of competition between the desirability of natural milk and liquid feed during the first day immediately following the farrow is undesirable. However, not providing any supplemental liquid feed during this period may even further decrease the likelihood of survival of undersized or weak piglets not able to compete for space at the mother's teat or decrease the fraction of survivor's within an oversized litter.

U.S. Pat. No. 5,115,764 teaches a milk delivery system that seeks to address the unique needs of a milk replacer product, employing a pump-driven system to prevent the liquid feed from becoming state by continuously circulating it through the system.

Prior art circulation-based liquid feed systems may be limited in the amount of liquid feed they can contain at any one time by the size of the reservoir in which mixing of the feed is carried out. With a relatively small mixing reservoir, such a system may therefore require significantly frequent refilling, while increasing the size of the mixing reservoir may be costly due to the added need for additional or enlarged mixing equipment. Also, these systems may experience a significant amount of waste as a result of a pressure differential occurring along the feed supply line, causing inappropriately high pressure at the first feeding station. This may lead to an excessive discharge rate of liquid feed at that first station, causing splashing of feed out of the unit and possibly startling the animal attempting to feed therefrom.

Cleaning of prior art liquid feeding systems with hot water solutions may require externally heating the water, or adding a separate reservoir to the system for that particular purpose, and may involve the use of toxic cleansers that must be thoroughly flushed from all surfaces prior to subsequent feeding from the system. The addition of a separate heating vessel might not be considered cost and space efficient, and the need to rinse away toxic substances after running a cleaning fluid through the system adds to the time and cost of cleaning the system.

From the forgoing, it will be appreciated that there is a desire for improved methods and systems for providing liquid feed to livestock.

SUMMARY OF THE INVENTION

According to a first aspect of the invention there is provided a liquid feed system for supplying liquid feed to piglets, the system comprising:

a reservoir;

at least one feeding station connected to and arranged to fluidly communicate with the reservoir to receive the liquid feed therefrom; and a refrigeration mechanism arranged to cool the liquid feed to be at a temperature below that of sow's milk upon reaching the feeding station from the reservoir.

The liquid feed system is intended for use as a supplemental feed supply for piglets having access to a mother sow's natural milk. Unlike the prior art where the liquid feed is heated to raise the temperature to a level comparable to the mother's milk, here the refrigeration not only helps keep the feed from spoiling, but is used specifically to achieve delivery of the liquid feed to the piglets at a temperature below that of the mother's milk so that the piglets will tend to rely on the mother's milk as a primary or preferred choice, but will be free to sip on the cooler supplemental feed when access to the mother's teat can't be achieved. This will help provide weaker or smaller piglets less able to compete with stronger piglets in rough conditions at the mother's teat with feed, while making full use of the mother's milk to keep supplemental feed costs down and providing the piglets with the benefits of the mother's natural milk.

Preferably the refrigeration mechanism is operably connected to the reservoir to effect cooling of the liquid feed in the reservoir.

Preferably there is provided a circulation line arranged to fluidly communicate at opposite ends thereof with the reservoir and a pump operatively installed on the circulation line, the at least one feeding station being installed on the circulation line between the opposite ends thereof.

Preferably the refrigeration mechanism is arranged to deliver the liquid feed to the feeding station below 37° C.

Preferably the refrigeration mechanism is arranged to deliver the liquid feed to the feeding station between 5 and 15° C.

According to a second aspect of the invention there is provided a liquid feed system for supplying liquid feed to piglets, the system comprising:
 a reservoir;
 a circulation line fluidly communicating at opposite ends thereof with the reservoir;
 at least one feeding station installed on the circulation line and arranged to receive the liquid feed therethrough from the reservoir;
 a pump operatively installed on the circulation line to circulate the liquid feed therethrough past the at least one feeding station; and
 a peroxide arranged to fluidly communicate with the circulation line and operable to add peroxide to the liquid feed passing by during circulation of the liquid feed.

Continuously injecting peroxide into the liquid feed continuously cleans the circulated feed by killing bacteria and prevents gorging by the piglets.

Preferably the peroxide doser is adjustable to change a dosage of peroxide injected into the circulation line over a fixed period of time. The adjustable doser allows significantly increased amounts to be injected into the line during circulation of a cleaning fluid through the system.

According to a third aspect of the invention there is provided a liquid feed system for supplying liquid feed to piglets, the system comprising:
 a reservoir;
 at least one feeding station arranged for fluid communication with the reservoir to receive the liquid feed therefrom;
 a refrigeration mechanism associated with the reservoir and selectively operable to effect cooling thereof; and
 a heating mechanism associated with the reservoir and selectively operable to effect heating thereof.

Preferably the reservoir is arranged for selective draining to facilitate removal of the liquid feed therefrom and addition of cleaning liquid thereto, selective operation of the refrigeration and heating mechanisms according to contents of the reservoir facilitating cooling of the liquid feed or heating of the cleaning liquid. The use of the same reservoir to cool liquid feed, to prevent spoiling or deliver cooler feed to the piglets, and heat a cleaning solution saves on space and eliminates the need to externally heat water for use in a cleaning solution.

Preferably the reservoir is defined by an interior of a selectively operable refrigeration container having selectively operable heating elements supported therein.

According to a fourth aspect of the invention there is provided a liquid feed system for supplying liquid feed to piglets, the system comprising:
 a mixing reservoir;
 a second reservoir;
 a connection line connected between the mixing reservoir and the second reservoir and arranged to establish fluid communication therebetween; and
 a circulation line arranged to fluidly communicate with the second reservoir at a first end and fluidly communicate with the mixing reservoir or the second reservoir at a second end;
 at least one feeding station installed on the circulation line between the first and second ends thereof and arranged to receive the liquid feed from the second reservoir through the circulation line;
 a pump operatively installed on the circulation line to circulate the liquid feed therethrough past the at least one feeding station; and
 a mechanism operable to control flow between the mixing reservoir and the second reservoir to selectively retain a batch of liquid feed in the mixing reservoir during a mixing operation or facilitate draining of the batch of liquid feed from the mixing reservoir into the second reservoir to facilitate mixing of a second batch of liquid feed in the mixing reservoir for subsequent circulation of both batches of liquid feed through the circulation line.

Including a second reservoir allows the mixing and use of more liquid feed in the system than a system featuring only a single reservoir, thereby decreasing the frequency at which the system needs to be refilled. A second reservoir is employed, for example, when the barn is larger than average size, or when limited staff is available and a 24-hour supply of liquid milk supplement needs to be mixed at one time.

Preferably the circulation line is arranged to also fluidly communicate the first end thereof with the mixing reservoir to receive the liquid feed from the mixing and second reservoirs simultaneously.

Preferably the pump is operable to draw the liquid feed from the mixing and second reservoirs simultaneously.

Preferably the pump is installed on the connection and circulation lines, the connection line connecting the mixing reservoir to an inlet of the pump and the second reservoir to a discharge of the pump and the circulation line connecting the second reservoir to the inlet of the pump, two control valves between the pump and the second reservoir being operable to open only one at a time to control whether the pump forces the liquid feed into the second reservoir from the mixing reservoir or from the second reservoir into the circulation line.

Preferably there is provided a third control valve on the circulation line on a side of the pump opposite the second reservoir, the third control valve being closable with the two control valves between the pump and the second reservoir positioned to direct liquid feed into the second reservoir from the mixing reservoir under operation of the pump.

According to a fifth aspect of the invention there is provided a method of feeding piglets comprising:
 providing the piglets with access to milk of a mother sow and to a feeding station; and
 delivering liquid feed to the feeding station at a temperature below the milk of the mother sow.

According to a sixth aspect of the invention there is provided a method of increasing piglet growth rate comprising:
 providing the piglets with access to milk of a mother sow and to a feeding station; and
 delivering liquid feed to the feeding station at a temperature below the milk of the mother sow.

Preferably the method involves allowing the piglets access to the liquid feed at the temperature below that of the sow's milk within 24 hours of birth.

Preferably the method involves allowing the piglets access to the liquid feed at the temperature below that of the sow's milk from birth.

Preferably the step of providing the piglets with access to the milk of the mother sow and to the feeding station comprises:
 providing in a hog barn, a liquid feed system for supplying liquid feed to piglets, the system comprising:
  a reservoir;
  a feeding station connected to and arranged to fluidly communicate with the reservoir to receive the liquid feed therefrom, said feeding station being positioned within a pen for access by piglets; and
  a refrigeration mechanism arranged to cool the liquid feed to be at a temperature below that of sow's milk upon reaching the feeding station from the reservoir; and allowing the piglets to feed at the feeding station.

According to a seventh aspect of the invention there is provided a liquid feed system for supplying liquid feed to livestock, the system comprising:

a reservoir;

a circulation line arranged to fluidly communicate with the reservoir at first and second ends of the circulation line;

a plurality of feeding stations installed on the circulation line at spaced positions therealong between the first and second ends thereof, flow from the circulation line for discharge from the each individual feeding station being restricted to passage through a corresponding orifice; and a pump operatively installed on the circulation line to convey the liquid feed through therethrough toward the second end thereof for recirculation from the reservoir;

cross sectional sizes of the corresponding orifices increasing from the a first of the plurality of feeding stations to a last of the plurality of feeding stations along the circulation line from the first end to the second end.

The flow rate at which liquid feed is discharged from the feeding stations is made more consistent along the circulation line by increasing the cross sectional area of the orifices through which the liquid feed passes on its way out of the feeding stations in the direction of flow. The smallest of the orifices, defined at the first feeding station, reduces the discharge flow rate that would otherwise occur due to the higher pressure of the liquid feed at the first feeding station relative to those further downstream.

BRIEF DESCRIPTION OF THE DRAWINGS

In the accompanying drawings, which illustrate an exemplary embodiment of the present invention.

DETAILED DESCRIPTION

Figure 1:
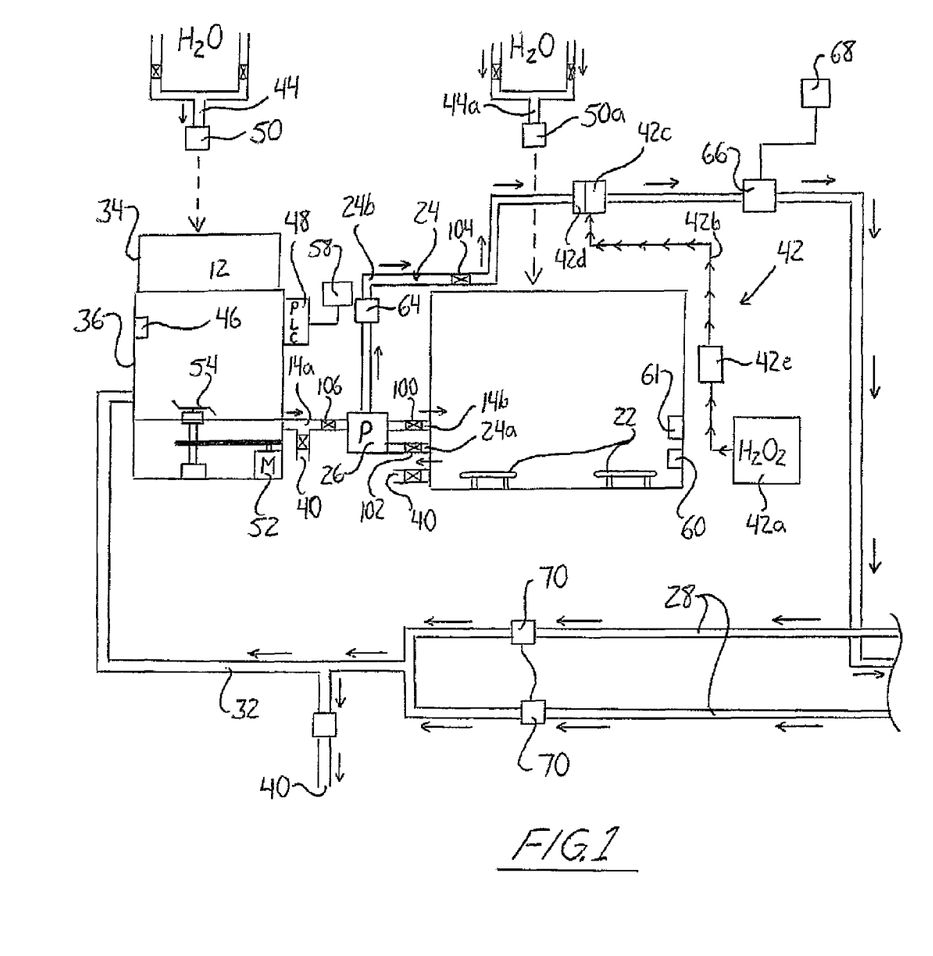
FIG. 1 is a schematic illustration of a mixing and delivery portion of a liquid feed system according to an embodiment of the present invention.
Figure 2:
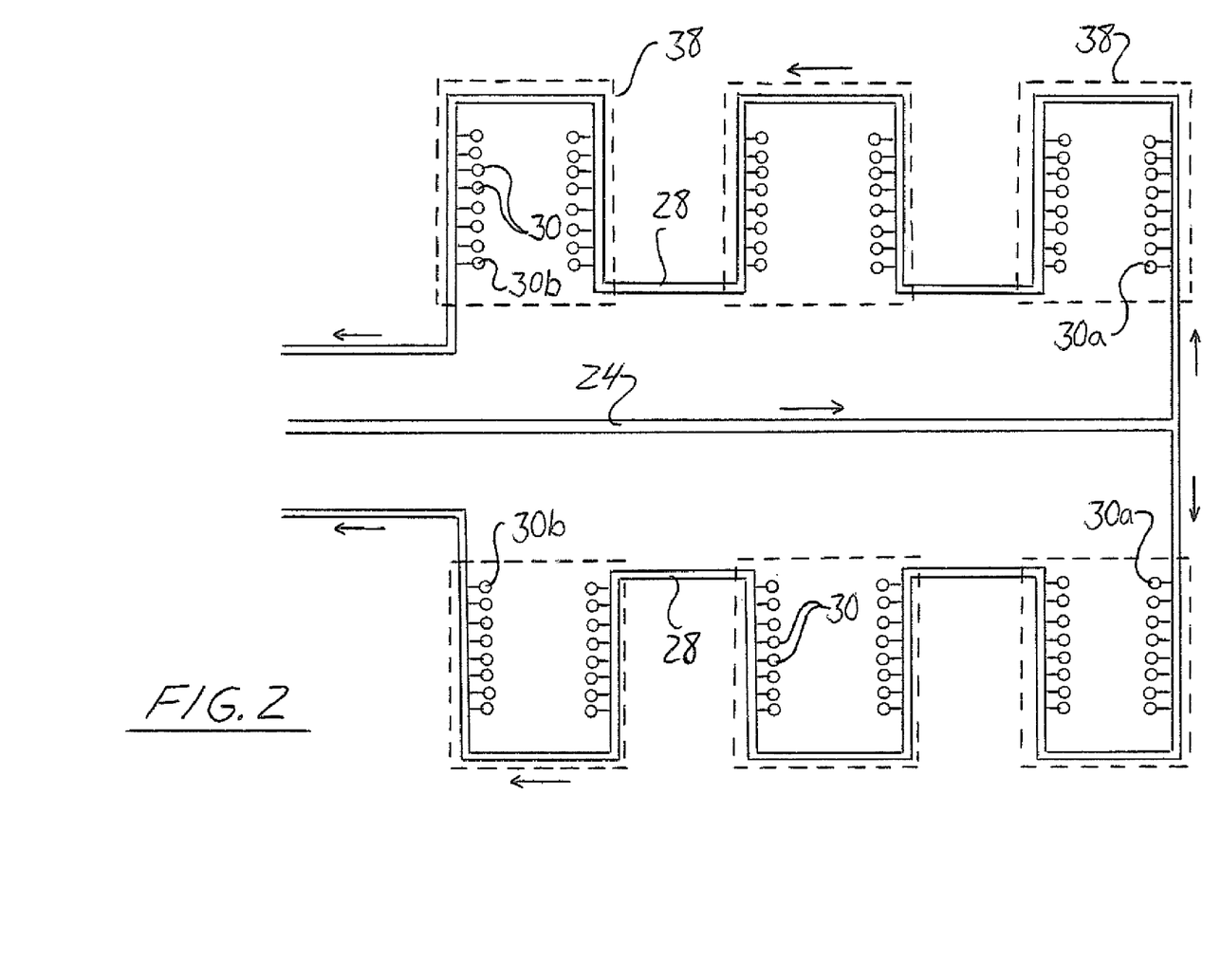
FIG. 2 is a schematic illustration of a feeding portion of the liquid feed system of FIG. 1.

FIGS. 1 and 2 show a feed system 10 for supplying supplemental liquid feed to piglets. As shown in FIG. 1, the system features a refrigerated mixing reservoir 12 having a connection line 14 in fluid communication with a drain of the mixing reservoir 12 at one end and with a larger second reservoir 18 at the other end. The larger second reservoir 18 is defined by a refrigeration container 20 having heating elements 22 installed within its interior. The refrigeration system and heating elements of the second reservoir 18 are selectively operable, one at a time, to either heat or cool a liquid contained within it. In addition to the connection line 14 linking the two reservoirs, a supply line 24 is arranged to communicate with the interior of the larger reservoir 18 and is equipped with a pump 26 to convey fluid from within the larger reservoir 18 further along the supply line 24. As shown in FIG. 2, the supply line branches into a pair of feed lines 28, each of which has a plurality of feeding units or stations 30 at spaced points therealong. At their ends opposite the supply line 24, the feed lines 28 once again converge and into a return line 32 that feeds back into the mixing reservoir 12. A circulating system is thus defined, as fluid from the mixing reservoir 12 can pass through the connection line to the larger reservoir 18, through the supply line 24 past the feeding units 30 on the feed lines 28 and into the return line 32 for return to the mixing reservoir 12.

With liquid feed such as a milk replacer product disposed within the system, the heating elements 22 in the larger reservoir are not activated, and instead the refrigeration systems of the refrigerated reservoir 12 and the larger reservoir 18 are run to effect sufficient cooling of the liquid feed to reach the feed stations 30 at a temperature below the temperature of a mother sow's milk, which is typically around 37° C., the approximate body temperature of the sow. Testing of the system has been carried out to maintain the liquid feed within a desirable temperature range between 5 and 15° C., with the liquid feed being cooled to leave the second reservoir at about 5° C. and picking up a maximum of about 10° C. from the surrounding environment in the feed and return lines before returning to the reservoirs for re-cooling back down to 5° C., thereby keeping the liquid feed below room temperature at all times.

It has been found that when both a lactating sow and supplemental liquid feed are both provided within areas accessible by the piglets, the piglets will consume the warmer sow's milk first and will only choose the cooler liquid feed when the sow's milk is restricted or unavailable. This allows for the optimum utilization of the sows milk with resulting improvement in sow performance. Sow performance is measured by reduced reproductive performance due to extra stress caused by constant production of large quantity of milk for the piglets during the entire lactation period and constant suckling by the piglets. Feeding piglets with supplemental milk results in improvement of the sow's reproductive function due to lack of suckling by the piglets as well as reduced amount of milk production during lactation. Use of the system to provide supplemental feed also improves piglet growth rate, specifically for small piglets which may not be able to compete sufficiently to get adequate amount of the mother sow's milk, at the least cost for liquid feed, as it is used to supplement, not replace, the mother's natural milk. It has been found that piglets will tend to switch back and forth between feeding at the sow and at the cooled liquid feeding system, for example to choose the system at times when the feeding area at the sow is crowded and rough with other piglets, and that they will tend to sip on the cooler liquid feed in smaller amounts than the naturally warm sow's milk. So relying on the sow's milk as the primary feed source is better for the piglets and ensures that the mother's milk will be used up to render her ready for the next breeding window, while the provision of the cooler supplemental feed allows more piglets to feed per sow and leads to a higher survival rate.

It should be appreciated from the forgoing that the use of the refrigerated mixing reservoir 12, as represented in FIG. 1 by a mixing container 34 supported within a refrigeration unit 36, alone may be sufficient to cool the liquid feed for delivery to the piglets below the temperature of the sow's milk, but the use of the second reservoir 18 in conjunction with the mixing reservoir 12 increases the liquid feed capacity of the system. A first batch of the mixture may be mixed in the mixing reservoir 12 and released into the second reservoir 18 to then facilitate the mixing of a second additional batch. Depending on the size of the second reservoir 18, which is larger than the mixing reservoir in the illustrated embodiment, the capacity of the system may be increased three-fold or more without having to build up the mixing equipment accordingly. This increased capacity along with the refrigerating and recirculating characteristics of the system, means that the system can be run for a longer period of time between feed refills and draining, as more feed can be added and will remain fresh longer due to the recirculation through the refrigerated reservoirs. For example, it may be possible to mix a 3-day supply of liquid feed in the system without worry of spoilage, compared to a recommended 1-day supply of a prior art non-refrigerated single-reservoir system.

Furthermore, the presence of the heating elements 22 at the bottom of the refrigeration container 20 of the larger reservoir 18 allows the use of the same space to perform two different functions at different times. When the feeding system is in use to deliver liquid feed to the piglets within furrowing rooms 38 (FIG. 2), along the perimeters of which the feed lines 28 extend and the feed stations 30 are spaced in the illustrated embodiment, the refrigeration container 20 of the larger second reservoir 18 is operated as described above to cool the liquid feed after mixing in the mixing reservoir and during subsequent circulations through the system. On the other hand, to ease the process of cleaning out the system after draining of any remaining liquid feed therefrom through valve-controlled drain spouts 40 provided on the mixing reservoir 12, larger second reservoir 18 and the return line 32, or elsewhere, the refrigeration system of the larger reservoir is shut down and water can be added into the larger reservoir 18, directly or through the mixing reservoir, and heated therein by the operation of the heating elements 22 for subsequent circulation through the system, alone or with additional cleaning agents, to wash out the lines. The inclusion of the heating elements 22 thus avoids the need to heat water externally for cleaning out of the system, and the mounting of the heating elements specifically within the refrigeration container saves space by avoiding a separate reservoir dedicated for heating or other cleaning or disinfecting operations. It should be appreciated that embodiments not featuring a second reservoir 18 may still provide similar advantages over the prior art by featuring heating elements disposed within the mixing reservoir 12.

The second reservoir 18 of the illustrated embodiment thus extends the shelf life of the liquid feed by reducing microbial growth through cooling, uses the same container for heating of water during the cleaning cycle of the system and allows larger quantities of liquid feed to be mixed. The resulting longer spans of time between batches prevent, or at least reduce the likelihood of, evening and weekend run outs that otherwise may occur with automated feeding systems that are not subject to overly regular checks during such times.

In the illustrated embodiment, the pump 26 is operable in cooperation with a series of solenoid valves installed in the connection and supply lines 14, 24 to either pump fluid from the mixing reservoir 12 to the larger second reservoir 18 or to pump fluid from both reservoirs 12, 18 simultaneously further into the supply line 24 for flow to the feeding stations 30. An intake portion 14a of the connection line 14 connects the mixing reservoir to an inlet of the pump for fluid flow therebetween, with a discharge portion 14b of the connection line 14 connecting a discharge of the pump to the larger second reservoir 18 to establish a flow path therebetween. Similarly, the supply line 24 features an intake portion 24a connecting the second reservoir to the inlet of the pump and a discharge portion 24b connected between the discharge of the pump and the feed lines 28 to establish a flow path from the pump past the feeding stations 30.

A first control valve 100 and a second control valve 102 are installed on the discharge portion 14b of the connection line and the intake portion 24a of the supply line 24 respectively. The first and second control valves 100, 102 are openable one at a time to control which one of these two line portions is open to allow fluid flow between the pump 26 and the larger second reservoir 18. When the first control valve 100 is open, the interior of the second reservoir 18 is in fluid communication with the discharge port of the pump 26 through the discharge portion 14b of the connection line 14 such that fluid drawn into the pump from the mixing reservoir 12 is pumped into the second reservoir 18. When the second control valve 102 is open, the interior of the second reservoir 18 is in fluid communication with the intake port of the pump 26 through the intake portion 24a of the supply line 24 such that fluid drawn into the pump from the larger reservoir 18 is pumped into the discharge portion 24b of the supply line 24 for delivery to the feeding stations 30. Operation of the first and second control valves to be open only one at a time therefore controls whether the pump forces the liquid feed into or out of the second reservoir.

A third control valve 104 on the discharge portion 24b of the circulation line on a side of the pump opposite the second reservoir 18 is closed with the first and second control valves 100, 102 open and closed respectively so that operation of the pump 26 to draw fluid from the mixing reservoir 12 will not circulate fluid through the supply, feed and return lines, but instead will act primarily to convey the fluid from the mixing reservoir 12 into the larger second reservoir 18. A fourth control valve 106 is installed on the intake portion 14a of the connection line 14 and is closable to selectively close off fluid flow into the pump 26 from the mixing reservoir 12 to retain liquid in the mixing reservoir during the initial mixing of a batch of milk replacer product.

For use in the mixing of dry or condensed milk replacer product, the automated feeding system 10 features a water input line 44 that feeds water into the mixing reservoir 12 with the fourth control valve 106 closed. A level indicator 46 sends a signal to a programmable logic controller (PLC) processor 48 when the desired maximum liquid level is achieved within the reservoir 12, and the PLC processor 48 then sends a signal to a solenoid valve 50 installed on the water input line 44 to effect closing of the solenoid valve 50 to shut off water supply to the mixing reservoir 12. The PLC processor 48 also controls a drive motor 52 of a mixer 54 depending into in the mixing container 34 of the mixing reservoir 12, which for example may be a 30-gallon container, to effect mixing. The mixer 54 is preferably run for an initial five minute period with automatic intermittent mixing controlled by the PLC processor 48 during subsequent circulation of the liquid feed through the system, for example for a 2 minute mixing action preferably carried out every 30 minutes on liquid feed passing through the mixing reservoir during circulation. The speed, length and frequency of the intermittent mixing can be varied from the exemplary values presented above, for example to accommodate varying water hardness from one barn to another, as the calcium content of relatively hard water may tend to force fat out of the liquid feed mixture.

The initial mixing effected within the mixing reservoir produces a relatively thick milk replacer concentrate. The PLC processor 48 then opens the first and fourth control valves 100 and 106, closes the second and third control valves 102, 104 and activates the pump to convey the concentrate from the mixing reservoir 12 into the larger second reservoir 18. Once this transfer of fluid is complete and the pump 26 is shut down, the fourth control valve 106 may be re-closed and the mixing and pumping processes repeated to generate a desired number of concentrate batches and pump them into the second reservoir 18. The number of times this mixing and draining process is performed is based on how much liquid feed is desirable to have in the system at one time and how much liquid feed the reservoirs can hold. Using a control panel 58 operably connected to the PLC processor, the number of concentrate batches to be mixed, within the range for which the system is capable of operation, can be selected.

Once the selected number of concentrate batches have been mixed and pumped into the second reservoir 18, a second water input line 44*a* feeds water into the second reservoir 18 upon opening of a solenoid valve on the second water line until a second level indicator 62, installed on the second reservoir 18, sends a signal to the PLC processor 48 when the desired maximum liquid feed level is achieved to acquire the desired water/powder ratio for the selected number of concentrate batches. The PLC processor 48 then sends a signal to the solenoid valve 50*a* installed on the second water input line 44*a* to effect closing of the solenoid valve 50*a* to shut off water supply to the larger second reservoir 18.

At this stage, the second and third control valves 102, 104 are opened, the first valve 100 is closed and the fourth valve 106 is kept open, so that activation of the pump will now draw the liquid feed from the second reservoir through the intake portion 24*a* of the supply line 24 and pump it further down the supply line 24 for flow past the feeding stations 30 through the feed lines 28. Feed not drawn off at the feed stations returns to the mixing reservoir 12 through the return line 32 and is drawn back into the pump 26 through the open intake portion 14A of the connection line 14 for recirculation through the system. The refrigeration systems of the reservoirs are run during the concentrate mixing, delivery to the second reservoir and watering down, and during subsequent circulation of the liquid feed through to ensure delivery to the feeding stations at a temperature well below that of a mother sow's milk.

The forgoing arrangement of the two reservoirs and the pump allows for the employment of only one mixer and one pump to achieve mixing and circulation of multiple batches of feed rather than multiple mixers and/or pumps. It should be appreciated that if the second reservoir is located at an elevation below the mixing reservoir 12, it may be gravity fed, in which case the pump 26 need only be installed on the supply line 24. The connection line 14 could thus be a single downward-depending continuous line connected between the reservoirs and uninterrupted by a pump. The connection line would still feature at least one control valve, equal in function to solenoid valve defining the fourth control valve 106 of the illustrated embodiment, operable between a closed position blocking flow through the connection line 14 to retain liquid feed in the mixing reservoir 12 during mixing and an open position allowing fluid flow through the connection line to facilitate draining of the mixing reservoir 12 into the second reservoir 18. The pump 26 could still be arranged to draw from both reservoirs simultaneously by adding another intake section to the supply line 24 connected between the intake port of the pump and the mixing reservoir 12 and possibly equipped with a control valve operable to close of this second intake section during mixing operations to retain fluid in the mixing reservoir. In other words, regardless of the mechanism used to effect draining of the mixing reservoir, flow out of the mixing reservoir can be closed off to allow mixing of a further batch of liquid feed concentrate in the mixing reservoir.

As shown in FIG. 1, the system 10 features a peroxide dosing arrangement 42 installed on the supply line 24 to inject drops of peroxide into the liquid feed on a continuous basis as it circulates through the system. A peroxide storage tank 42*a* features a one-way delivery line 42*b* arranged to drain the storage tank 42*a* and connected to the supply line 24 at an injector 42*c*. A flow meter 42*d* installed on the supply line 24 to measure the flow rate of liquid feed therethrough in a position proximate the injector is operably connected to a doser 42*e* installed on the delivery line 42*b* to control the flow of peroxide from the storage tank 42*a* to the injector 42*c* in response to the flow rate of the liquid feed.

The introduction of peroxide into the lines kills bacteria, and the controlled continuous supply using the doser and injector ensures that the milk is continuously cleaned, whereas without an injector, a single dose added to the liquid feed at the mixing stage would decrease in effect over time as the feed is circulated through the system. It has been found that a controlled amount of peroxide in the liquid feed increases shelf-life of reconstituted milk and prevents gorging by the animals, thereby further optimizing the use of liquid feed amounts. During the cleaning cycle of the system, where water heated within the second reservoir 18 is circulated through the system, the peroxide doser 42*e* is adjusted to increase the dosage of peroxide added to the lines to effect thorough cleaning of the system. The dosing arrangement eliminates the physical handling of peroxide during cleaning of the system and eliminates or reduces the need for toxic cleansers by allowing larger doses of peroxide to be used in their place. The hydrogen peroxide is generally considered to be safe, and therefore feeder bowls do not need to be covered during cleaning, as is typically done when using toxic cleaner. As a result, the time and cost for cleaning bowls may be significantly reduced.

Once the desired number of liquid feed concentrate batches have been fed into the system 10, mixed in the mixing reservoir 12 and discharged to and diluted in the second reservoir 18, the PLC processor 48 controls the positions of the control valves as described above and activates the pump 26 to begin circulating the liquid feed through the system. In its first pass, the liquid feed is pumped through the supply line 24 to the feed lines 28, having small doses of peroxide added by the dosing arrangement 42 on the way. The feeding stations or units 30 are of a type arranged to open to the feed line 28 only in response to demand, for example by the opening of a valve at the feeding station effected by an animal or in response to a drop in the level of liquid feed in the station's bowl or container below a predetermined level, so that feed is not continuously discharged from the line 28 into the feeder, but rather will simply pass thereby for recirculation in the system unless the feeder's valve is opened. Feeders of these types are known, with an example of an animal-actuated feeder suitable for use with piglets and the feeding system of the presently illustrated embodiment being taught in U.S. Patent Application Publication No. 2005/0056228. Animal controlled, rather than level controlled, feeders are preferable to reduce the occurrence of the cooled liquid feed sitting unconsumed at the feeding station and absorbing heat from the surrounding environment.

Figure 3A:
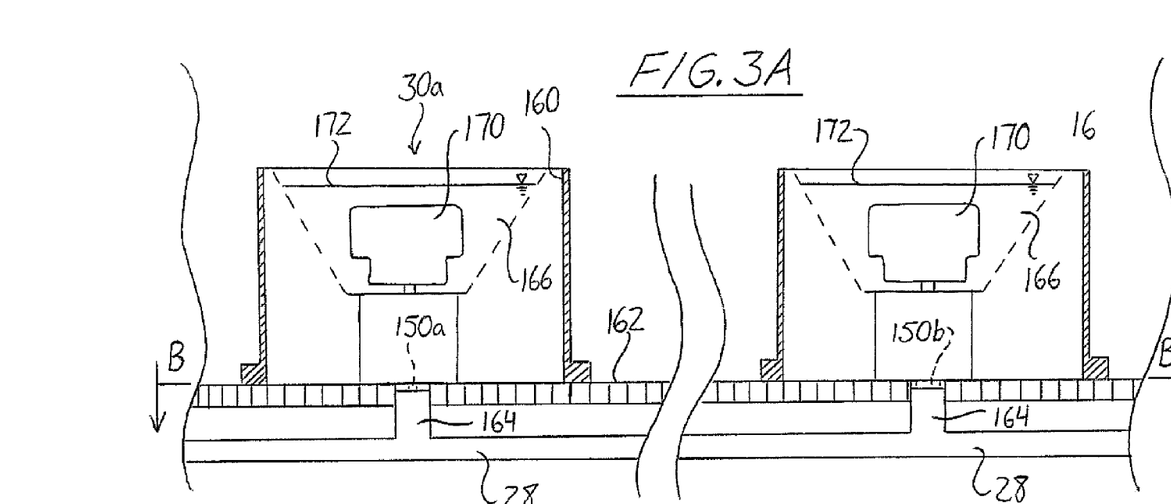
FIG. 3A is a side elevational schematic view of first and last feeding stations spaced along the feeding portion of the liquid feed system of FIG. 2.
Figure 3B:
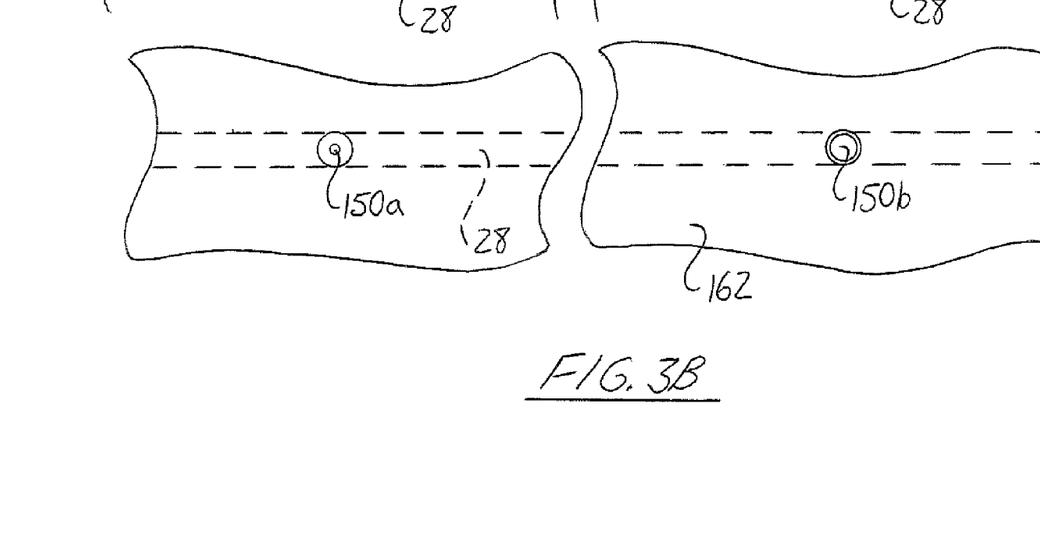
FIG. 3B is a cross sectional schematic view taken along line B-B of FIG. 3.

In other conventional milk delivery systems, there is lot of waste of milk replacer due to variation in flow rate from bowl to bowl, since the liquid is under higher pressure (for example, approx 30 psi) at a bowl installed at the front of the supply line and is under low pressure (for example, approx 5 psi) when at a bowl installed at the end of the supply line. As shown in FIG. 3, the system has been adapted to ensure that the flow rate of liquid feed entering the bowl of a feeding station from the feed line 28 remains generally constant from bowl to bowl throughout the system. This pressure consistency is maintained from bowl to bowl by varying the size of an orifice through which the liquid feed passes from the feed line 28 into the bowl according to the location of the bowl in the system.

In FIGS. 2 and 3, each feed line 28 branching off from the supply line features a first feeding station 30*a* located at the front of the feed line 28 nearest the connection thereof to the supply line and a last feeding station 30*b* located at the opposite end of the supply line nearest the junction of the feed lines back into the single return line 32. As shown in FIG. 3B, the cross sectional area of the orifice 150*a* through which liquid feed enters the bowl of the first feeding station 30*a* from the feed line 28 is significantly smaller than the corresponding orifice 150*b* employed at the last feeding station 30*b*. The increase in orifice size bowl to bowl from the first feeding station 30*a* to the last feeding station 30*b* compensates for the reduction in the pressure of the liquid feed, the smaller orifices near the front of the feed lines reducing the flow rate into the feeding station bowls at these higher pressure regions. It should be appreciated that each and every feeding station need not necessarily have a distinct orifice size different from every other station to benefit from the increase in orifice size along the feed line in the direction of flow. For example, feeding stations having a common orifice size may be grouped together along the feed line, the orifice size increasing from one group of feeding stations to the next along the feed line in the direction in which the liquid feed is being circulated through the system.

In the illustrated embodiment, the feeding stations are of the type taught in U.S. Patent Application Publication No. 2005/0056228. Each station features a bowl or cup 160, which may have an inner angled bottom as shown in FIG. 3A in dashed lines and may rest on the floor 162 of a farrowing room or crate 38, in the case of feeding piglets. The supply line 28 runs adjacent the feeding station or unit 30, with an extension 164 branching off the feed line 28 for connection to each feeding station 30. Liquid feed 166 passes through the extension 164 into a valve 168 though the orifice defined therebeteween. A push-type omni-directional mushroom-shaped valve head 170 may be employed, as it can be animal-actuated and will rest below the surface level 172 of the liquid feed 166 when the cup 160 is full. An omni-directional mechanism also allows access to the liquid feed 16 without requiring that the animals learn a particular necessary movement of the valve 168. The liquid feed 166 enters the cup 48 by way of a discharge 174, arranged so as to direct the flow of liquid feed 166 downwards in the cup 48 rather than upwards toward the animal as in the prior art. The omni-directional mushroom valve head 170 allows the cup 160 to accommodate young animals such as piglets from birth, and the cup 160 may be provided with a removable extension restable on a lip 176 of the bowl to effectively increase the depth of the feeding station 14 so that older piglets can continue to use the system even when increasing in size and feeding aggressiveness.

In-line temperature and pH monitors are included in the system to monitor pH and temperature levels, optimum values of which have been found to improve liquid feed uptake by the piglets.

An in-line temperature sensor 64 is installed on the discharge portion 24*b* of the supply line 24 proximate an end of this portion nearest the pump so as to monitor the temperature of the liquid feed as it leaves the refrigerated reservoirs for conveyance onward to the feeding stations 30. The temperature sensor 64 may be wired to an alarm, the PLC processor 48 or the refrigeration systems of the reservoirs so that if the temperature of the liquid feed exceeds a predetermined limit, an alarm will be actuated, the system will shut down or the level of refrigeration will be increased. A preferable temperature range for liquid feed circulating through the system is 5-15° C., but the limit(s) at which the temperature sensor is to trigger an alarm signal or shut down the system may of course be varied.

An in-line pH monitor 66 is installed on the supply line 24 proximate an end thereof nearest the pump so as to monitor the pH of the liquid feed as it circulates through the system.

The pH monitor 66 is wired to an alarm 68 to produce a signal upon detection of a low pH level indicative of the milk replacer having soured to inform an operator that the system should be flushed out. The pH monitor 66 also may trigger a signal upon detection of a high pH level in the liquid feed in order to inform the operator so that acid may be manually added to the liquid feed to lower the pH. A preferable pH range for liquid feed circulating through the system is 5.3-5.8, but the limit(s) at which the pH monitor is to trigger an alarm signal or shut down the system may of course be varied.

A differential pressure monitor triggers an alarm when the system runs dry of liquid feed or develops a significant leak. Two pressure sensors 70 are installed on the circulation lines past the feeding stations in the direction of flow through the system, specifically one on each of the feed lines proximate the ends at which they rejoin to communicate with the return line 32 connecting back to the mixing reservoir 12. If pressure in one of the two feed lines drops past a predetermined threshold value due to a leak in the system, the pressure sensor 66 will signal the PLC processor 48 to immediately shut down the pump and an alarm will be triggered. The threshold value is chosen to be below a normal pressure range experienced during typical operation of the pump and feeding stations and measured under a confirmed leak-free condition of the system after initial installation thereof.

It should be appreciated that the temperature sensor, pH monitor or pressure sensor(s) may be installed elsewhere in the system or that additional sensors or monitors may be added.

Liquid feed not discharged to the feeding stations 30 continues through the feed lines 28 into the return line 32 to flow back into the mixing reservoir 12, completing its first pass and being ready for further circulation through the system. The refrigeration systems of the two reservoirs continue running through this circulation process to counteract any warming of the liquid feed having occurred during its circulation to the feeding stations 30 and back to maintain a discharge temperature at the feeding stations below the temperature of a sow's milk.

The cleaning cycle of the system, selectable by the user using the PLC control panel, involves adding water to the system, for example using the second water input line 44*a* to add water directly to the second reservoir or using the first water input line 44 to add water to mixing reservoir 12 for pumping onward into the second reservoir. The water may be added in a known amount by use of the second level sensor 61 in the larger second reservoir 18 or through cooperation of the first level sensor 46 in the mixing reservoir 12, the PLC processor 48, the first and fourth control valves 100, 106 and the pump 26. With the refrigeration systems of the two reservoirs shut down, the heating elements 22 in the second reservoir 18 are activated to heat the water found therein, the water being retained in the second reservoir during this heating by closure of the first and second control valves 100, 102 and the pump not being run. Once the water has reached a predetermined temperature, a temperature sensor 60 supported within the second reservoir sends a signal to the PLC processor 48 to open the second and third control valves 102, 104 and operate the pump 26 to begin circulating the heated water through the system. The peroxide doser 42 is adjusted to distribute a significantly increased amount of peroxide per unit time into the supply line 24 during the cleaning cycle compared to that added during the feeding cycle. When the cleaning cycle is completed, the cleaning solution is drained through the drain spouts 40 and the system is once again ready to mix and distribute liquid feed.

It should be appreciated that the feeding system of the present invention is not limited to the particular environment or arrangement shown in FIG. 2, which shows feeding units or stations 30 situated in farrowing rooms 38, illustrated in broken lines, with the supply line 24 extending to the most remote of the farrowing rooms 38, where it delivers liquid feed to two non-linear return lines 18 along which the farrowing rooms 44 are laid out. It will also be apparent to those of skill in the art that the cooling of the liquid feed for delivery to the piglets at a temperature below that of the sow's milk, the use of a second reservoir separate from the mixing reservoir and the use of a single reservoir for both cooling of liquid feed and heating of cleaning fluid may be applied to feeding systems other than that shown in the figures are not limited to any particular feeding station layout nor to application in a circulating type system.

Furthermore, the delivery of the liquid feed at a temperature below that of the sow's milk, the use of a single reservoir for both cooling of liquid feed and heating of cleaning fluid and the use of a peroxide doser in a circulating liquid feed system may be applied to feeding systems having only a single reservoir. In two reservoir circulating systems, the return line of the circulation lines need not necessarily connect back to the mixing reservoir, as it may connect back to the second reservoir and thereby limit the use of the first reservoir to the initial steps where liquid is added to the system. In such an instance, refrigeration of the mixing reservoir, if applied at all, may be limited to these initial steps only in order to conserve energy.

In use, the feeding system provides supplemental milk for piglets, as discussed above. As a result of this arrangement, morbidity and/or mortality of piglets is reduced compared to piglets that are not supplemented with milk replacer. As will be appreciated by one of skill in the art, currently 70-80% of piglets who die during weaning, die during the first 7-8 days due to space limitations, post partum sow problems and/or starvation. However, the above-described feeding system provides feeding stations for the piglets to access when milk from the sow is unavailable and is available from birth. As a result of this arrangement, not only is morbidity and/or mortality reduced, wean weight and rate of weight gain are also increased compared to piglets of similar age and type but not supplemented with milk replacer. In the prior art, liquid feed typically was not provided within the first 24 hours of birth to avoid the piglets feeding on the supplemental feed instead of the valuable contents of the mother's milk only available for a short window after birth. With the liquid feed delivered to the piglets at a temperature below the mother's milk in the illustrated embodiment of the present invention, the piglets can be provided with access to the supplemental feed on this first day as they will tend to go first to the mother's milk due to its preferred temperature.

The use of the system of the illustrated embodiment therefore not only establishes a method of feeding piglets involving providing the piglets with access to milk of a mother sow and to a feeding station and delivering liquid feed to the feeding station at a temperature below the milk of the mother sow, but also establishes a method of increasing piglet growth rate by providing, in a hog barn, a liquid feed system featuring a refrigeration mechanism arranged to cool the liquid feed to be at a temperature below that of sow's milk upon reaching the feeding station, which is positioned within a pen for access by piglets and arranged to fluidly communicate with a reservoir to receive the liquid feed therefrom, and allowing the piglets to feed at the feeding station.

There are also other benefits to such an arrangement. For example, the milk replacer can be supplemented with vaccines, antibiotics or the like, thereby providing an effective way for administering these compounds to a plurality of piglets. For example, the supplemental feed mixture may include antibody-containing dried egg powder as taught in U.S. Patent Application Publication No. 2007/0071795, which shows that supplementing animal feed with polyclonal antibodies directed against one or more pathogens improves growth of piglets, as improvements to gut health and that provide a more balanced gut microflora will improve animal growth. The pathogens do not necessarily have to be causing disease, but may still consume nutrients or cause nutrients to be used less efficiently by the host animal, thereby reducing growth. Furthermore, improving gut health will have several beneficial effects, for example, reducing inflammation, which will in turn improve for example nutrient absorption and uptake. Similarly, mortality and morbidity are decreased because of the treatment and/or removal of disease but also by the promotion of growth. As the system and method described herein above for delivering supplemental liquid feed to piglets at a temperature noticeably lower than that of the mother's milk allows supplemental feed to be provided right from birth, the antibody-containing material or other beneficial additives can be provided in the piglet-accessible liquid feed from as early on as day one, thereby acting sooner to provide benefits such as improved gut health, growth promotion, increased feed intake, increased daily or extended period weight gain, reduced gut inflammation and improved nutrient absorption and uptake.

Furthermore, as discussed above, because the milk replacer is at a different temperature than the sow's milk, they will preferentially use the sow's milk when available but will ingest the milk replacer when it is not. However, once the sow's milk is gone, the piglets can use the feeding station, meaning that the piglets do not undergo a reduction in weight gain when the sow's milk stops. To similarly avoid a lag or drop in weight when transferring piglets to a nursery from the farrowing area, the same feeding stations may be used in the two areas so that the piglets entering the nursery will immediately recognize the feeders and won't hesitate to feed. Furthermore, the availability of the milk replacer once the sow's milk has been exhausted ensures that the sow is in condition for the next round of breeding.

The use of a PLC processor provides for automatic control over the water input lines 44, 44a; the mixer 54; the pump 26 and its control valves 100, 102, 104, 106; the peroxide doser 42e; and the refrigeration systems of the two reservoirs 12, 18 when the operator selects a feeding mode or cycle at the PLC control panel 58 and indicates the number of batches to be mixed and circulated. This automatic control eliminates the need for further action by the operator beyond this initial input to the processor and the addition of powdered or condensed feed product to the mixing reservoir, which may also be possible to automate using known methods. Cooperation of the PLC processor with the pressure, temperature and pH monitors allows shutting down of the system or signaling to the operator, whether locally or remote from the hog barn in which the system is installed, upon detection of a problem. Similarly the cooperation of the PLC processor the pump 26 and its control valves, the heating elements 22 of the second reservoir, the second water input 44a and the peroxide doser 42e allows cleaning of the system simply by choosing a cleaning mode or cycle at the PLC control panel 58.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A liquid feed system for supplying liquid feed to piglets, the system comprising:
   a feeding area and a supply of natural sow's milk provided at a first temperature at said feeding area, the feeding area and the supply of natural sow's milk being accessible to piglets for consumption of the natural sow's milk while at the first temperature;
   a reservoir containing a supply of a liquid milk-replacer product;
   at least one feeding station installed at a position accessible by piglets from the feeding area, each feeding station being connected to and arranged to fluidly communicate with the reservoir to receive the liquid milk-replacer product therefrom; and
   a refrigeration mechanism arranged to cool the liquid milk-replacer product to arrive at the feeding station from the reservoir at a second temperature that is below the first temperature at which the natural sow's milk is provided, below an ambient temperature at the feeding area and the feeding station, and known to be less desirable for consumption by the piglets;
   whereby the system is arranged is provide natural sow's milk at a consumption temperature more preferable to piglets than the second temperature at which the milk replacer product is provided.

2. The system according to claim 1 wherein the refrigeration mechanism is operably connected to the reservoir to effect cooling of the liquid milk-replacer product in the reservoir.

3. The system according to claim 1 comprising a circulation line arranged to fluidly communicate at opposite ends thereof with the reservoir and a pump operatively installed on the circulation line, the at least one feeding station being installed on the circulation line between the opposite ends thereof.

4. The system according to claim 3 further comprising a peroxide doser arranged to fluidly communicate with the circulation line and operable to add peroxide to the liquid milk-replacer product passing by during circulation of the liquid milk-replacer product.

5. The system according to claim 4 wherein the peroxide doser is adjustable to change a dosage of peroxide injected into the circulation line over a fixed period of time.

6. The system according to claim 3 comprising:
   a circulation line arranged to fluidly communicate with the reservoir at first and second ends of the circulation line; and
   a pump operatively installed on the circulation line to convey the liquid milk-replacer product through therethrough toward the second end thereof for recirculation from the reservoir;
   the at least one feeding station comprising a plurality of feeding stations installed on the circulation line at spaced positions therealong between the first and second ends thereof, flow from the circulation line for discharge from the each individual feeding station being restricted to passage through a corresponding orifice; and
   cross sectional sizes of the corresponding orifices increasing from a first of the plurality of feeding stations to a last of the plurality of feeding stations along the circulation line from the first end to the second end.

7. The system according to claim 1 wherein the natural sow's milk is at approximately 37° C. and the refrigeration mechanism is arranged to deliver the liquid milk-replacer product to the feeding station between 5 and 15° C.

8. The system according to claim 1 wherein the refrigeration mechanism is arranged to deliver the liquid milk-replacer product to the feeding station between 5 and 15° C.

9. The system according to claim 1 wherein the refrigeration mechanism is associated with the reservoir and selectively operable to effect cooling thereof and the system further comprises a heating mechanism associated with the reservoir and selectively operable to effect heating thereof.

10. The system according to claim 9 wherein the reservoir is arranged for selective draining to facilitate removal of the liquid milk-replacer product therefrom and addition of cleaning liquid thereto, selective operation of the refrigeration and heating mechanisms according to contents of the reservoir facilitating cooling of the liquid milk-replacer product or heating of the cleaning liquid.

11. The system according to claim 9 wherein the reservoir is defined by an interior of a selectively operable refrigeration container having selectively operable heating elements supported therein.

12. The system according to claim 1 further comprising:
    a second reservoir;
    a connection line connected between the reservoir and the second reservoir and arranged to establish fluid communication therebetween; and
    a circulation line arranged to fluidly communicate with the second reservoir at a first end and fluidly communicate with the reservoir or the second reservoir at a second end, the at least one feeding station being installed on the circulation line between the first and second ends thereof and arranged to receive the liquid milk-replacer product from the second reservoir through the circulation line;
    a pump operatively installed on the circulation line to circulate the liquid milk-replacer product there through past the at least one feeding station; and
    a mechanism operable to control flow between the mixing reservoir and the second reservoir to selectively retain a batch of liquid milk-replacer product in the mixing reservoir during a mixing operation or facilitate draining of the batch of liquid milk-replacer product from the mixing reservoir into the second reservoir to facilitate mixing of a second batch of liquid milk-replacer product in the mixing reservoir for subsequent circulation of both batches of liquid milk-replacer product through the circulation line.

13. The system according to claim 12 wherein the circulation line is arranged to also fluidly communicate the first end thereof with the mixing reservoir to receive the liquid milk-replacer product from the mixing and second reservoirs simultaneously.

14. The system according the claim 13 wherein the pump is operable to draw the liquid milk-replacer product from the mixing and second reservoirs simultaneously.

15. The system according to claim 14 wherein the pump is installed on the connection and circulation lines, the connection line connecting the mixing reservoir to an inlet of the pump and the second reservoir to a discharge of the pump and the circulation line connecting the second reservoir to the inlet of the pump, two control valves between the pump and the second reservoir being operable to open only one at a time to control whether the pump forces the liquid milk-replacer product into the second reservoir from the mixing reservoir or from the second reservoir into the circulation line.

16. The system according to claim 15 further comprising a third control valve on the circulation line on a side of the pump opposite the second reservoir, the third control valve being closable with the two control valves between the pump and the second reservoir positioned to direct liquid milk-replacer product into the second reservoir from the mixing reservoir under operation of the pump.

* * * * *